United States Patent [19]

Teramachi

[11] Patent Number: 4,579,395
[45] Date of Patent: Apr. 1, 1986

[54] ROLLER BEARING AND FEED TABLE FOR LINEAR SLIDING MOTION

[76] Inventor: Hiroshi Teramachi, 2-34-8, Higashi-Tanagawa, Setagaya-Ku, Tokyo, Japan

[21] Appl. No.: 586,773

[22] Filed: Mar. 6, 1984

[30] Foreign Application Priority Data

Mar. 8, 1983 [JP] Japan ................... 58-36542

[51] Int. Cl.[4] ............................................. F16C 29/06
[52] U.S. Cl. ..................................................... 308/6 C
[58] Field of Search ...................... 308/6 C, 6 R, 6 A; 464/168

[56] References Cited

U.S. PATENT DOCUMENTS

| | | | |
|---|---|---|---|
| 1,915,585 | 6/1933 | Wingquist | 308/216 X |
| 2,142,474 | 1/1939 | Langhaar | 308/216 |
| 2,857,764 | 10/1958 | Frank | 308/6 R |
| 3,008,774 | 11/1961 | Morris et al. | 308/6 C X |
| 3,236,569 | 2/1966 | Moosmann | 308/6 R |
| 3,301,611 | 1/1967 | Dunlap | 308/6 C |
| 3,752,541 | 8/1973 | McVey | 308/6 C |
| 4,302,059 | 11/1981 | Teramachi | 308/6 R X |
| 4,396,235 | 8/1983 | Teramachi | 308/6 C |

Primary Examiner—Stuart S. Levy
Assistant Examiner—Lynn M. Sohacki
Attorney, Agent, or Firm—Kenyon & Kenyon

[57] ABSTRACT

Disclosed is a roller bearing for linear sliding motion for use in machines such as a machining center. The roller bearing includes a slider having a horizontal portion and a vertical portion depending from one end of the slider, the slider being provided with a pair of loaded grooves. The slider is also provided with a pair of non-loaded portions. A pair of roller guides are attached to the other end of the horizontal portion and to the lower end of the vertical portion, respectively, of the slider and cooperate with the loaded grooves and non-loaded portions to form a pair of endless roller tracks. A track shaft is provided which has roller-contacting surfaces opposing to the roller contacting surfaces formed on the horizontal and vertical portions of the slider. A multiplicity of rollers are disposed so as to be circulated through respective endless roller tracks formed on the horizontal and vertical portions of the slider, thereby to bear the load acting between the roller-contacting surfaces on the slider and corresponding roller-contacting surfaces on the track shaft.

16 Claims, 28 Drawing Figures

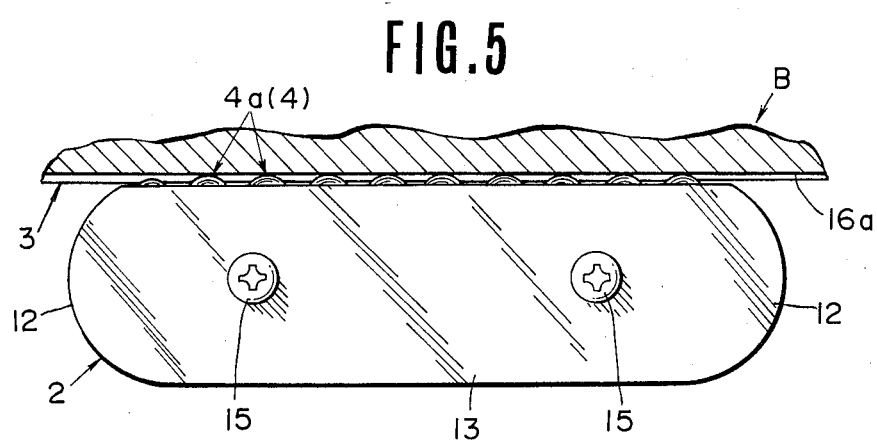
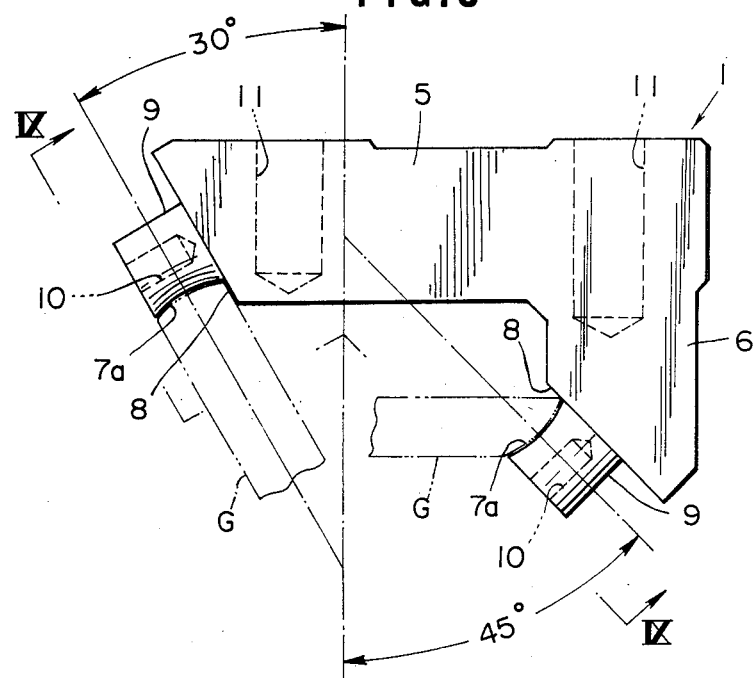

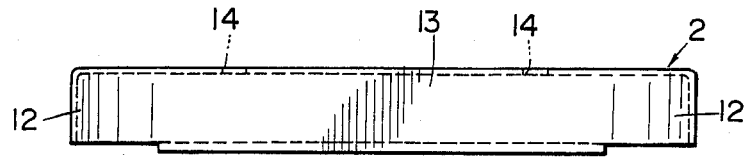
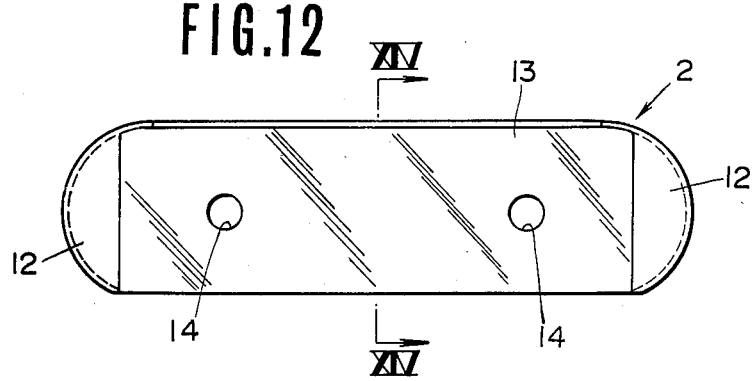
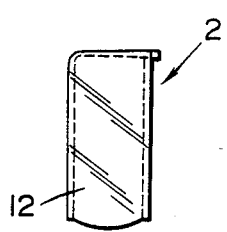
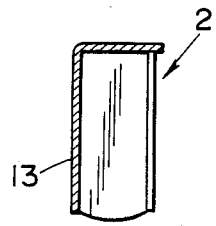
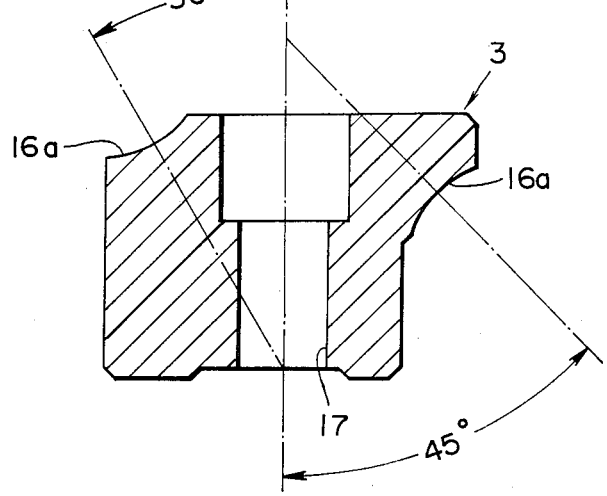

ROLLER BEARING AND FEED TABLE FOR LINEAR SLIDING MOTION

BACKGROUND OF THE INVENTION

The present invention relates to a roller bearing for linear sliding motion and a feed table for linear sliding motion making use of the roller bearing.

Nowadays, the bearings for guiding a linear motion, as well as feed tables find uses for various industrial purposes and fields including machining centers, numerical control lathes and other machine tools, and for sliding parts of various machines such as automatic tool exchangers, automatic welders, injection machines, industrial robots, and so forth.

Most of the known bearings and tables of the kind described employ balls as the means for guiding linear sliding motion of the slider along the track shaft. The slider, as well as the track shaft, is constructed to have a cross-section which is symmetrical with respect to the vertical plane containing the longitudinal central axis thereof, and both arm or sleeve portions of the slider embrace corresponding shoulder portions of the track shaft in order to prevent the slider from floating above the track shaft.

The sliding contact between the slider and the track shaft is made through trains of balls. In order to bear a heavy load, it is necessary to elongate the loaded regions of the endless tracks in the track shaft so that the load may be shared by a greater number of balls, resulting in an increased size of the slider. On the other hand, the track shaft is provided with pairs of ball-rolling grooves formed in the surfaces of respective shoulder portions. Loaded balls on the slider roll along these ball-rolling grooves so that the balls in each pair of ball-rolling grooves clamp the corresponding shoulder portion of the track shaft so as to bear loads acting in all directions. Thus, the known bearing or feed table of the type described requires four grooves formed in the track shaft and four endless tracks in the slider. Therefore, the production of such slider and track shaft requires a large number of steps, particularly for the cutting and finishing of these grooves and tracks, as well as an impractically large number of parts, resulting in an increased cost of production.

SUMMARY OF THE INVENTION

Accordingly, an object of the invention is to provide a roller bearing for linear sliding motion, as well as a feed table incorporating the roller bearing, which incorporates a pair of trains of rollers capable of bearing heavy load in all directions, particularly in the vertical direction and, thus reduces the number of rolling surfaces on the slider and the track shaft which are difficult to machine, while minimizing the number of parts and hence the cost of production.

To this end, according to one aspect of the invention, there is provided a roller bearing for linear sliding motion comprising: a slider having a horizontal portion and a vertical portion depending from one end of the slider, the slider being provided with a pair of loaded grooves respectively formed in the lower surface of the other end of the horizontal portion and in the inner surface of the lower end of the vertical portion, each of the loaded grooves having a roller-contacting surface constituting a loaded region, the slider being provided also with a pair of non-loaded portions extending axially along the other end of the horizontal portion and on the lower end of the vertical portion, respectively, so as to constitute non-loaded regions; a pair of roller guides attached to the other end of the horizontal portion and to the lower end of the vertical portion, respectively, of the slider and cooperating with the loaded grooves and non-loaded portions to form a pair of endless roller tracks; a track shaft having roller-contacting surfaces opposed to the roller-contacting surfaces formed on the horizontal and vertical portions of the slider; and a multiplicity of rollers adapted to be circulated through the respective endless roller tracks formed on the horizontal and vertical portions of the slider, thereby to bear the load acting between the roller-contacting surfaces on the slider and corresponding roller-contacting surfaces on the track shaft.

According to another aspect of the invention, there is provided a feed table for linear sliding motion comprising: a pair of sliders each having a horizontal portion and a vertical portion depending from one end of the slider, the slider being provided with a pair of loaded grooves respectively formed in the lower surface of the other end of the horizontal portion and in the inner surface of the lower end of the vertical portion, each of the loaded grooves having a roller contacting surface constituting a loaded region, the slider being provided also with a pair of non-loaded portions extending axially along the other end of the horizontal portion and on the lower end of the vertical portion, respectively, so as to constitute non-loaded regions; a pair of roller guides attached to the other end of the horizontal portion and to the lower end of the vertical portion, respectively, of each slider and cooperating with the loaded grooves and non-loaded portions to form a pair of endless roller tracks; a bed provided on its upper surface with a pair of mounting reference surfaces; a pair of track shafts fixed to the mounting reference surfaces and having roller-contacting surfaces opposing to the roller-contacting surfaces formed on the horizontal and vertical portions of the slider; a multiplicity of rollers adapted to be circulated through respective endless roller tracks formed on the horizontal and vertical portions of the slider, thereby to bear the load acting between the roller contacting surfaces on the slider and corresponding roller contacting surfaces on the track shaft; and a mounting base attached to the upper surfaces of the sliders.

These and other objects, features and advantages of the invention will become clear from the following description of the preferred embodiments taken in conjunction with the accompanying drawings.

BRIEF DESCRIPTION OF THE DRAWINGS

FIG. 5 is a view as viewed in the direction of an arrow V—V of FIG. 1;

FIG. 6 is a front elevational view of a track shaft incorporated in the bearing shown in FIG. 1;

FIG. 11 is a bottom plan view of the roller guide;

FIG. 12 is a rear elevational view of the roller guide as shown in FIG. 10;

FIG. 13 is a side elevational view of the roller guide as shown in FIG. 10;

FIG. 14 is a sectional view taken along the line XIV—XIV of FIG. 12;

FIG. 15 is an end view of a track shaft incorporated in the bearing shown in FIG. 1;

DESCRIPTION OF THE PREFERRED EMBODIMENTS

Figure 1:
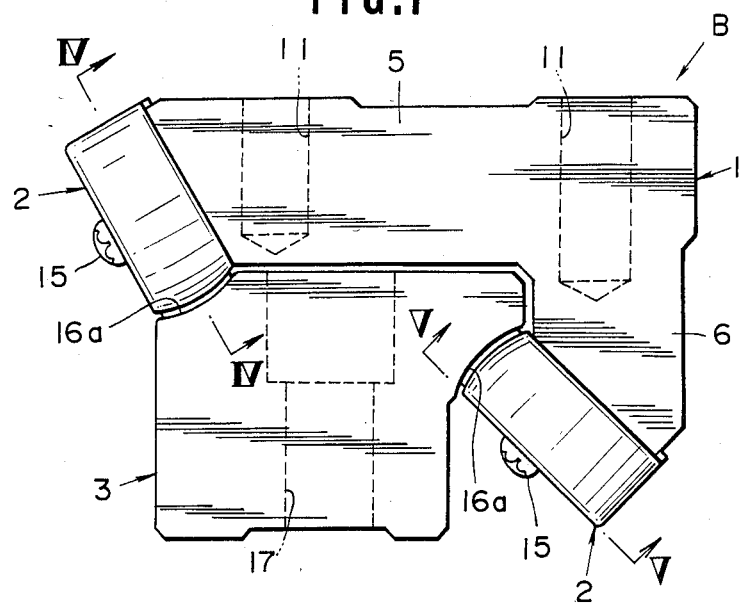
FIG. 1 is a front elevational view of a roller bearing for linear sliding motion in accordance with a first embodiment of the invention.
Figure 2:
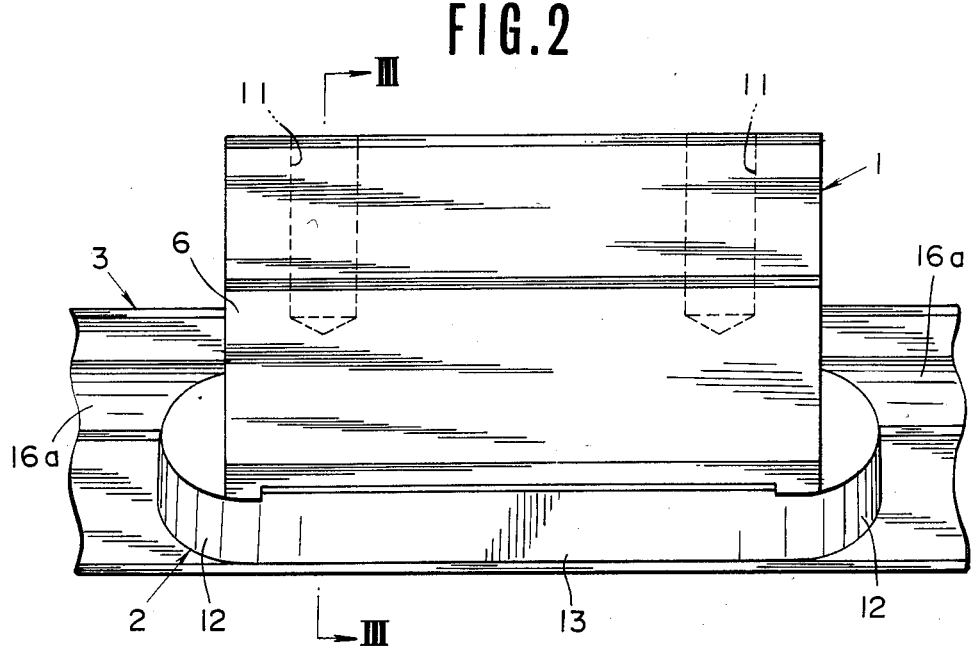
FIG. 2 is a side elevational view of the roller bearing shown in FIG. 1.
Figure 3:
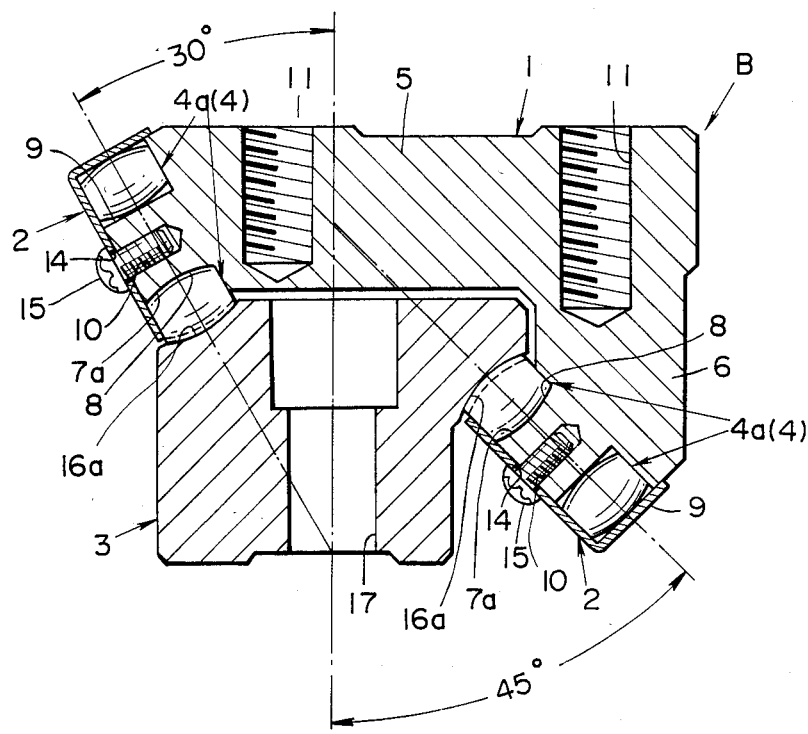
FIG. 3 is a sectional view taken along the line III—III of FIG. 2.
Figure 4:
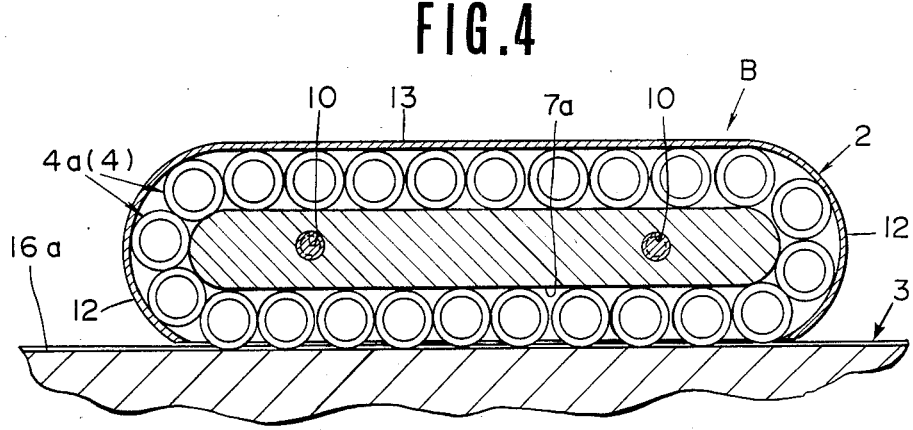
FIG. 4 is a sectional view taken along the line IV—IV of FIG. 1.
Figure 7:
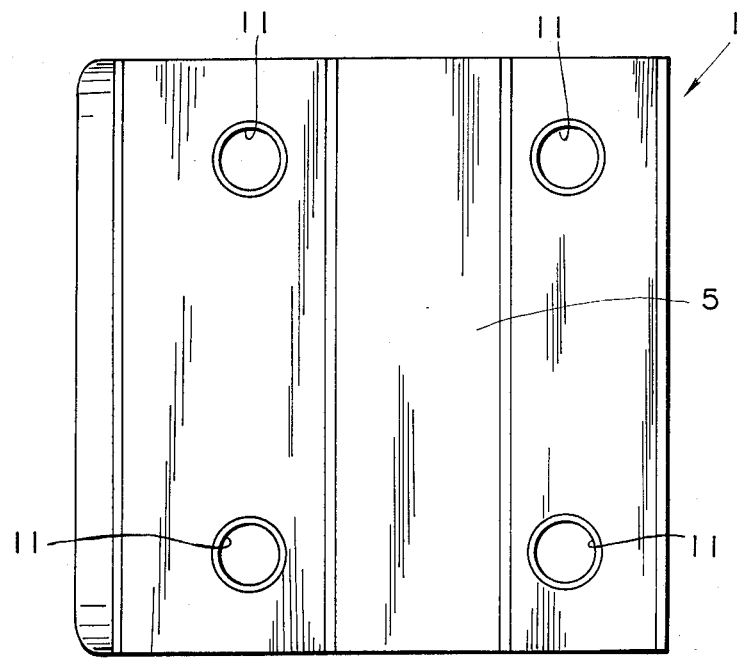
FIG. 7 is a plan view of the track shaft as shown in FIG. 6.
Figure 8:
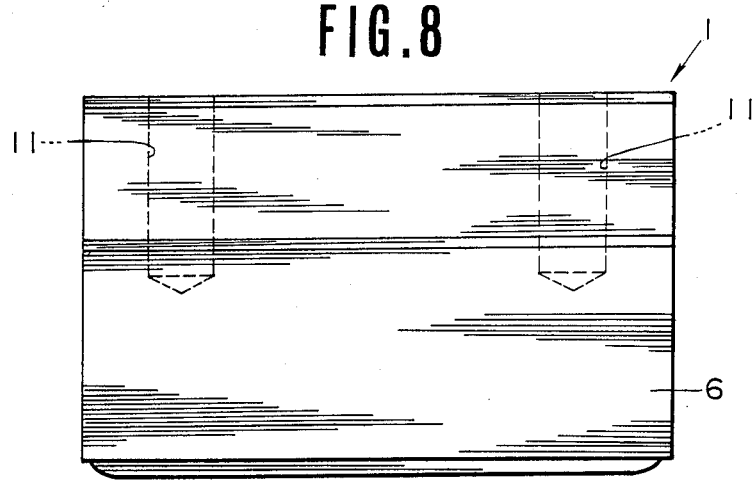
FIG. 8 is a side elevational view of a track shaft as shown in FIG. 6.
Figure 9:
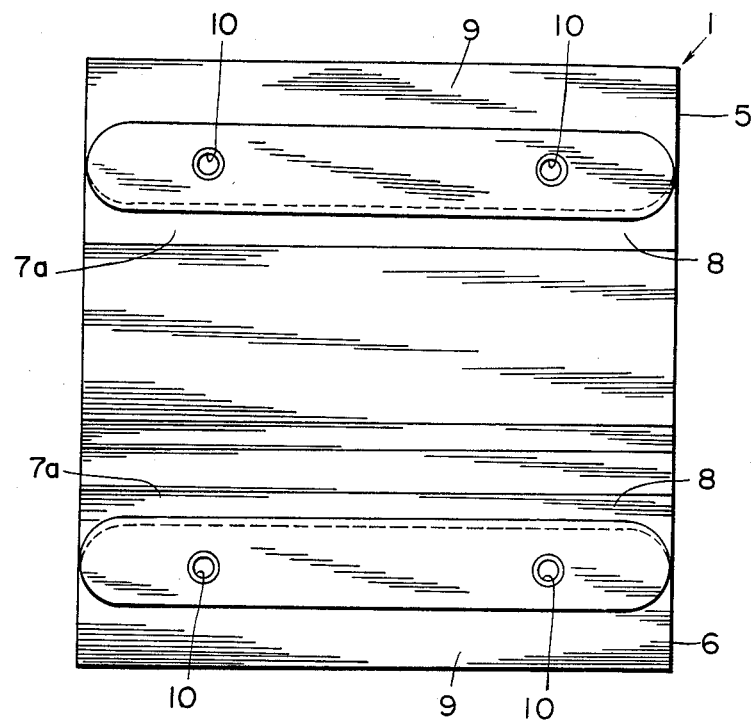
FIG. 9 is a view as viewed in the direction of arrows IX—IX of FIG. 6.
Figure 10:
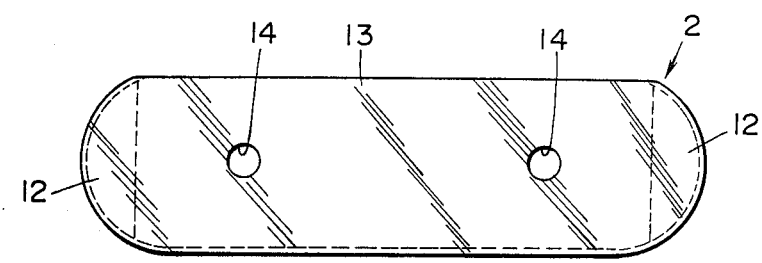
FIG. 10 is a front elevational view of a roller guide incorporated in the bearing shown in FIG. 1.
Figure 16:
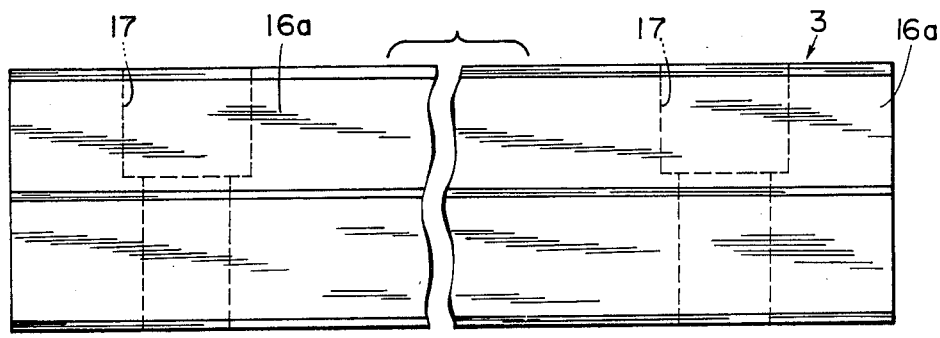
FIG. 16 is a side elevational view of the track shaft as shown in FIG. 15.

Referring to FIGS. 1 to 5, a roller bearing B for linear sliding motion in accordance with a first embodiment of the invention has a slider 1 having a horizontal portion 5 and a vertical portion 6 depending from one or basal side of the horizontal portion 5. These portions 5 and 6 in combination provide an inversed L-shaped cross-section of the slider 1 as a whole. The roller bearing B further has a pair of roller guides 2 which are attached to the other distal side or end of the horizontal portion 5 and the lower end of the vertical portion 6, a track shaft 3 disposed under the horizontal portion 5, and a multiplicity of rollers which are adapted to be circulated in endless roller tracks formed in the horizontal and vertical portions 5 and 6 thereby to bear the load transmitted between the slider 1 and the track shaft 3. In this first embodiment, the rollers 4 are spheroidal rollers 4a having spheroidal surfaces.

As will be seen from FIG. 3 and FIGS. 6 to 9, loaded grooves 8 are formed on the lower side of the distal end of the horizontal portion 5 and on the inner side of the lower end of the vertical portion 6 to extend in the axial direction of the slider. Each of these loaded grooves 8 has an arcuate roller-contacting surface 7a and constitutes the loaded region of the endless roller track. At the same time, formed on the upper side of the distal end of the horizontal portion 5 and on the outer side of the lower end of the vertical portion 6 are non-loaded portions, which are, in this case, grooves 9 constituting the non-loaded regions of the endless roller tracks. In these Figures, a reference numeral 10 denotes threaded holes for receiving screws by means of which the roller guides 2 are attached to respective portions of the slider 1, while numeral 11 designates threaded holes for receiving screws by means of which a later-mentioned mounting bed is secured to the slider 1.

As will be seen from FIGS. 2 to 5 and FIGS. 10 to 14, each roller guide 2 is formed by press from a metal sheet or by injection molding of a hard resin, and is provided at its both ends with substantially semi-circular roller turning sections 12. These roller turning sections 12 are connected to each other through the intermediary of a holding section 13 having a substantially L-shaped cross-section which, in cooperation with the loaded grooves 8 and non-loaded grooves 9 respectively formed on the distal end of the horizontal portion 5 and the lower end of the vertical portion 6 of the slider 1, forms the respective loaded and non-loaded regions of the endless roller tracks. Thus, the rollers 4 in the form of the spheroidal rollers 4a, rolling from the loaded region into the non-loaded region and vice versa, are guided and turned smoothly by respective ball turning sections 12. A reference numeral 14 designates through holes formed in the holding sections 13 of the roller guides 2. The roller guides 2 are secured to the slider 1 by means of screws 15 which extend through the through holes 14 and are screwed into the threaded holes 10 in the slider 1.

Referring to FIGS. 1 to 3 and FIGS. 15 and 16, the track shaft 3 has one shoulder portion provided with an upwardly-directed oblique roller-contacting surface 16a, and the other shoulder portion projected laterally, the surface 16a being in spaced opposite relation to the roller contacting surface 17a formed in the lower side of the other end of the horizontal portion 5 of the slider 1. The projected shoulder portion is provided at its lower side with a downwardly-directed oblique roller contacting surface 16a opposing to the roller-contacting surface 7a formed on the inner side of the lower end of the vertical portion 6 of the slider 1. The roller-contacting surfaces 16a have arcuate surfaces of the same curvature as that of the roller contacting surfaces 7a. A reference numeral 17 denotes holes for receiving bolts by which the track shaft 3 is fixed to a mounting reference surface as formed on a bed of various apparatus which will be mentioned later.

Figure 17:
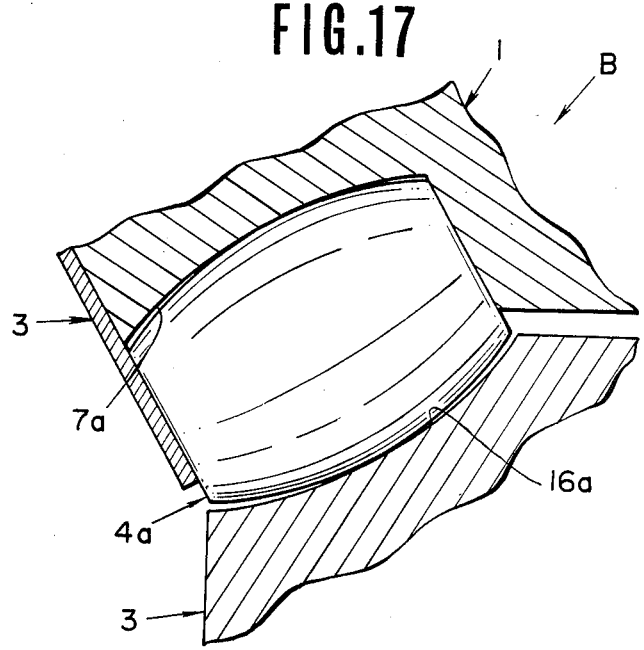
FIG. 17 is a partial enlarged sectional view showing, in an exaggerated manner, the relationship between the roller contacting surface and the spherical surface of a roller.

In this first embodiment, the roller-contacting surfaces 7a and 16a formed on the slider 1 and the shaft track 3, respectively, have a radius of curvature which is slightly greater than that of the spheroidal surface of the spheroidal rollers 4a, as shown in a somewhat exaggerated manner in FIG. 17. It is also to be noted that the roller-contacting surfaces 7a and 16a adjacent the distal end of the horizontal portion 5 of the slider 1 are inclined at an angle of 30° with respect to the vertical line, while the roller-contacting surfaces 7a and 16a adjacent the lower end of the vertical portion 6 of the slider 1 are inclined at an angle of 45° relative to the vertical line, as will be understood from FIGS. 3,6 and 15.

Figure 18:
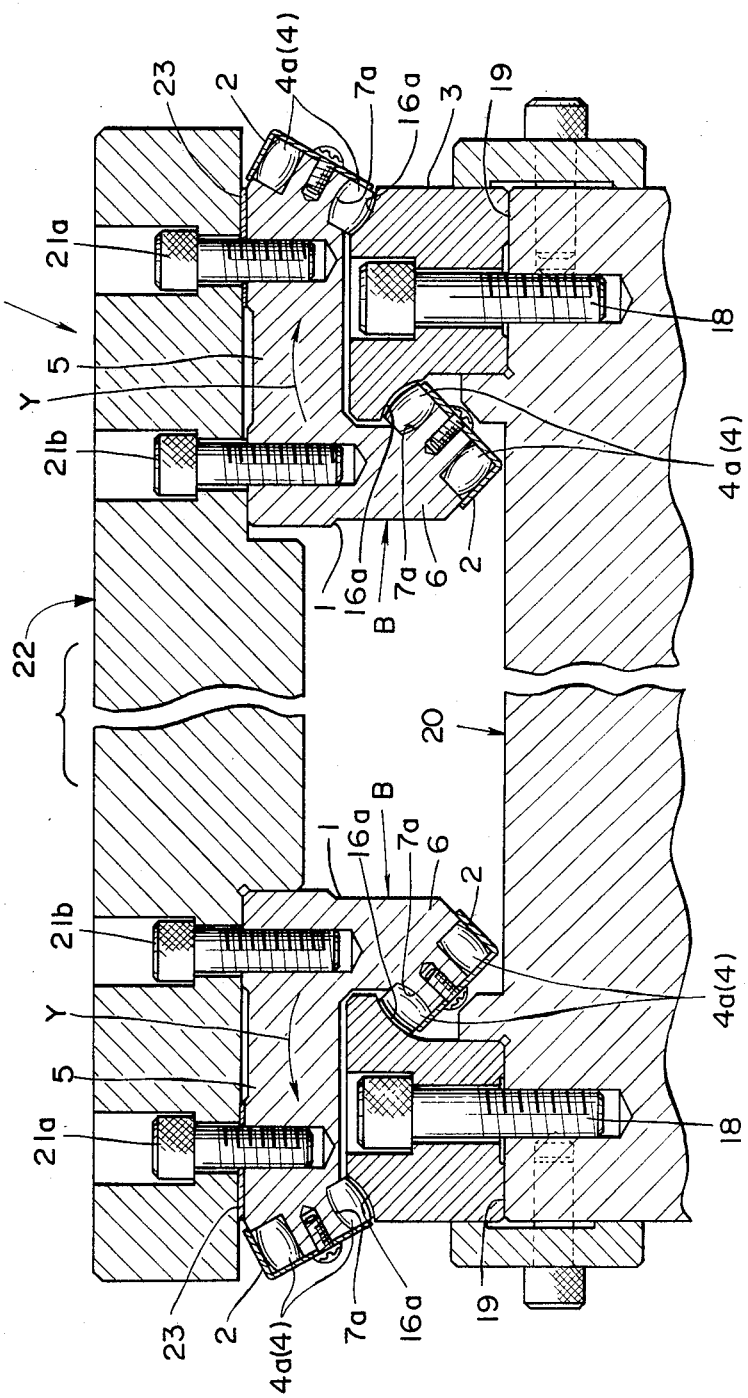
FIG. 18 is a cross-sectional view of a feed table incorporating the roller bearing of the first embodiment.

Referring now to FIG. 18, there is shown a feed table T incorporating the roller bearing B for linear sliding motion of the first embodiment. The feed table T has a pair of the roller bearings B of the first embodiment, each being composed of a slider 1, a pair of roller guides 2, a track shaft 3 and a multiplicity of spheroidal rollers 4a, a bed 20 provided with a pair of mounting reference surfaces 19 to which the track shafts 3 are secured by means of mounting bolts 18, and a mounting base 22 which are connected to the sliders 1 by means of connecting bolts 21a,21b. Two pairs of bolts 21a,21b, spaced in the breadthwise direction of the slider 1, are used for each slider 1. In other words, each slider 1 is secured to the mounting base 22 through four bolts 21a,21a and 21b,21b.

In this feed tables, the roller bearings B arranged in a pair are disposed such that the ends of the horizontal portions 5 thereof are directed outwardly, i.e. in the opposite directions. Shims 23 of limited thickness are disposed between the upper surfaces of the ends of horizontal portions 5 of respective sliders 1 and the lower side of the mounting base 22, so that, when the bolts 21a and 21b are tightened to fix the mounting base 22 on the sliders 1, a greater amount of rotation is imparted to the inner rows of bolts 21b than to the outer rows of bolts 21a, so that a twisting motion, as indicated by an arrow Y, is given to each slider 1 thereby to apply a pre-load to the spheroidal rollers 4a.

Figure 19:
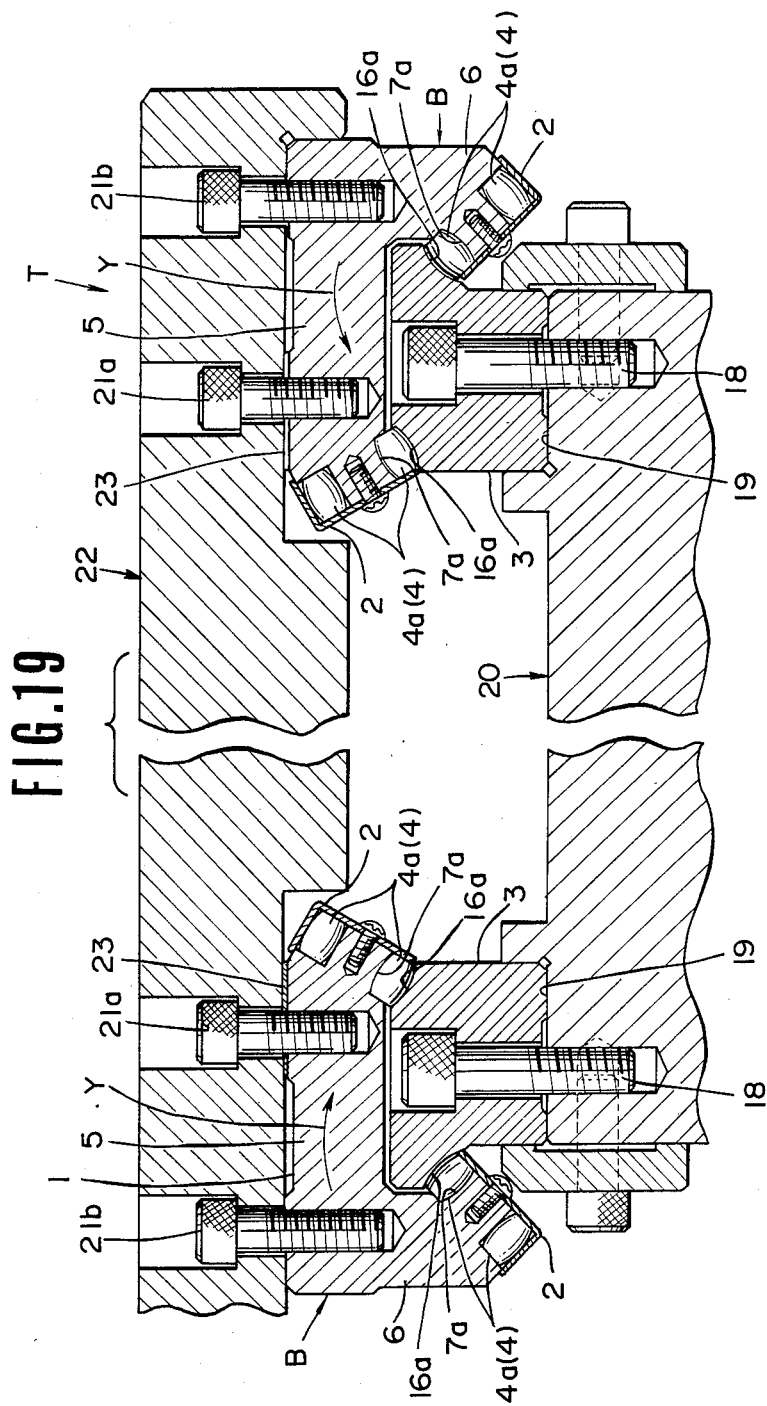
FIG. 19 is a cross-sectional view of a modification of the feed table incorporating the roller bearing of the first embodiment.

In this feed table T for linear sliding motion, the pair of roller bearings B may be arranged such that the distal ends of the horizontal portions 5 thereof face each other, as shown in FIG. 19.

The feed tables T for linear sliding motion as shown in FIGS. 18 and 19 is assembled in accordance with the following procedure. First of all, the track shafts 3 are secured to the mounting reference surfaces 19 on the bed 20 by means of the bolts 18, thereby to mount the roller bearings B on the bed 20. Then, the mounting base 22 is attached to the upper surfaces of the sliders 1 by tightening the screws 21a,21b, with shims 23 interposed between the upper surfaces of the distal ends of the horizontal portions 5 of respective sliders 1 and the lower surface of the mounting base 22 so as to apply the pre-load to the spheroidal rollers 4a arranged between the rolling surfaces 7a,16a of respective roller bearings B. The thickness of the shims 23 is so selected as to impart a suitable level of the pre-load.

In the embodiment described hereinbefore, the roller bearings B are preloaded by the tightening of the connecting bolts 21a,21b with the shims 23 interposed between the upper surfaces of the distal ends of horizontal portions 5 of respective sliders 1 and the lower surface of the mounting base. This way of imparting the pre-load, however, is not essential. Namely, in an alternative arrangement, shims of a large thickness are disposed between the upper surfaces of the sliders 1 adjacent to the distal ends of the horizontal portions 5 and the lower surface of the mounting base 22, while interposing shims of a small thickness between the upper surfaces of the sliders adjacent to the vertical portions 6 and the lower surface of the mounting base 22. It will be clear to those skilled in the art that these shims of different thicknesses provide twisting forces and, hence, preloads the roller bearings B by an amount corresponding to the difference in the thickness of the shims. Instead of using the shims 23, it is also possible to impart a pre-load to the roller bearings B by tapering the portions of the lower surface of the mounting base 22 contacted by the upper surfaces of the sliders 1.

The roller bearing B for linear sliding motion in accordance with the first embodiment and the feed table T making use of this roller bearing offer the following advantages.

Firstly, the troublesome drilling or boring work for forming the non-loaded region of the endless tracks is elminated because the non-loaded regions can be presented in the form of non-loaded grooves 9 which are easy to machine and finish. Secondly, the roller guides 2 can easily be formed by press from a metal sheet or by an injection molding from a hard resin. Thus, the slider 1 having endless roller tracks on the distal end of the horizontal portion 5 and the lower end of the vertical portion 6 thereof, as well as the roller guides 2, can be produced at a high efficiency and, hence, at a reduced cost of production.

The use of the spheroidal rollers 4a as the rollers 4 provide a remarkable improvement in the self-centering function of the bearing thereby to accommodate any dimensional or mounting error when the bearing is incorporated in various devices. Furthermore, since the radius of curvature of each roller-contacting surfaces 7a,16a is selected to be slightly greater than the radius of curvature of the spheroidal surface of the spheroidal roller 4a, the smoothness of the linear sliding motion is never impaired even by a slight skew of rollers, i.e. an inclination of the roller axis from the initial position, because such a skew can effectively be absorbed by a shift of the points of contact of the spheroidal surfaces of the spheroidal rollers. Consequently, any edge load, i.e. the concentration of load on the axial ends of the rollers, is avoided to ensure a longer life of the rollers and to accommodate a greater amount of mounting error.

Figure 20:
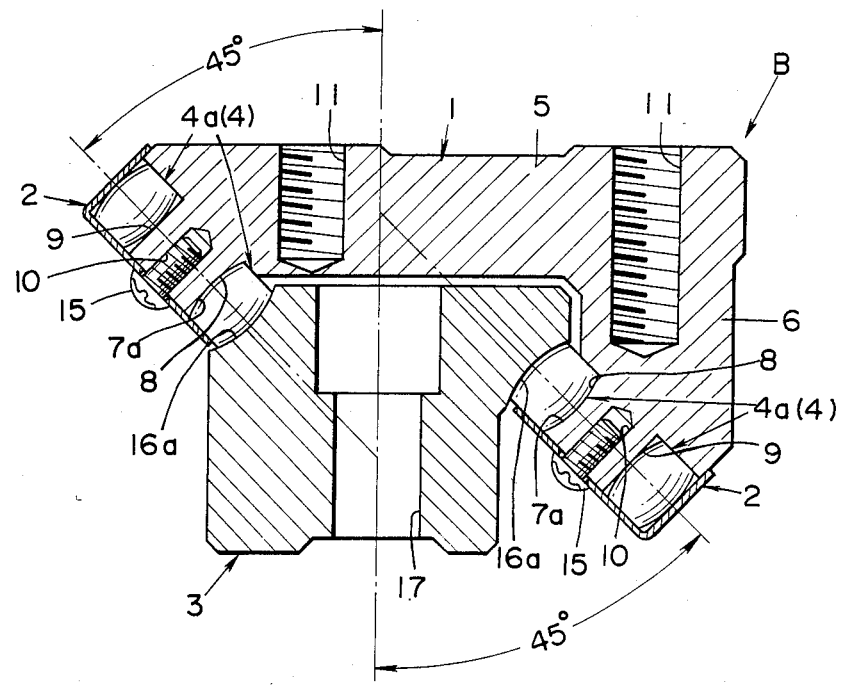
FIG. 20 is a sectional view similar to that in FIG. 3, showing a roller bearing for linear sliding motion in accordance with a second embodiment of the invention.

In the embodiment described hereinbefore, the roller-contacting surfaces 7a and 16a adjacent to the horizontal portion 5 of the slider are inclined at 30° to the vertical plane, while the roller-contacting surfaces 7a and 16a adjacent to the vertical portion 6 of the slider 1 are inclined at 45° to the vertical plane so that the roller bearing as a whole can bear load in all directions, particularly the vertical load acting downwardly. This arrangement, however, is not exclusive. Namely, all roller contacting surfaces 7a and 16a may be inclined at 45° to the vertical plane, as shown in FIG. 20, so that the roller bearing as a whole bears the horizontal and vertical loads equally.

Figure 21:
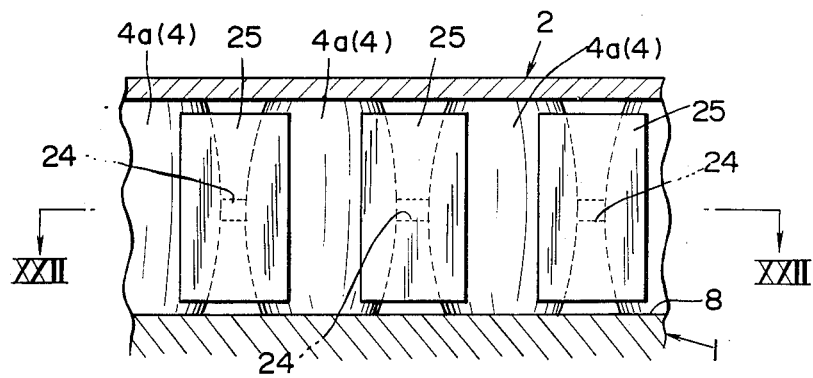
FIG. 21 is a sectional view showing spacers disposed between adjacent spheroidal rollers.
Figure 22:
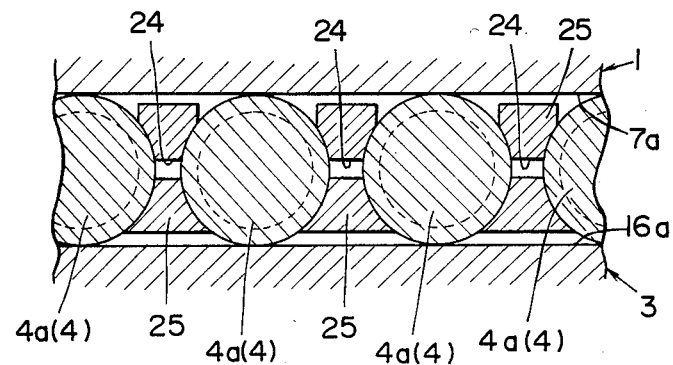
FIG. 22 is a sectional view taken along the line XXII—XXII of FIG. 21.
Figure 23:
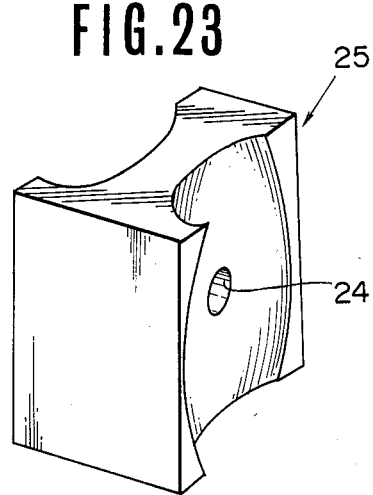
FIG. 23 is a perspective view of the spacer as shown in FIG. 21.

FIGS. 21 to 23 show a modification in which a spacer 25 having a central oil-retaining through hole 24 is interposed between adjacent spheroidal rollers 4a which are recirculated through the endless roller tracks formed on the distal end of the horizontal portion 5 and the lower end of the vertical portion 6 of the slider 1 in cooperation with respective roller guides 2. The spacer 25 effectively prevents the skew of the spheroidal rollers 4a thereby to completely eliminate any edge load on the rollers and to avoid mutual contact between adjacent rollers thereby to suppress the noise while ensuring a smooth sliding motion.

Figure 24:
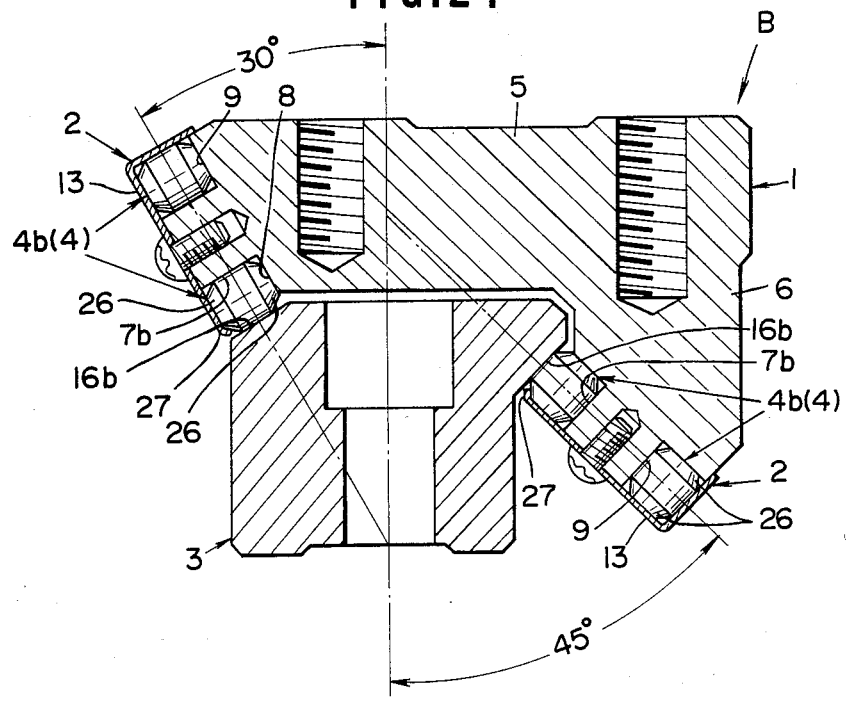
FIG. 24 is a sectional view similar to that in FIG. 3, showing a roller bearing in accordance with a third embodiment of the invention.

FIG. 24 shows a roller bearing B in accordance with a second embodiment of the invention in which, unlike the first embodiment described hereinbefore, the roller-contacting surfaces 7b and 16b respectively formed in the slider 1 and the track shaft 3 are made flat to cooperate with rollers 4 which are, in this case, cylindrical rollers 4b. The cylindrical rollers 4b are chamfered at both axial ends thereof to provide tapered portions 26, while the holding section 13 of the roller guide 12 is bent at its one end in conformity with the tapered portion 26 of the roller to provide a retaining claw 27 which effectively serves to prevent the rollers from coming off from the loaded region of the endless roller track.

Figure 25:
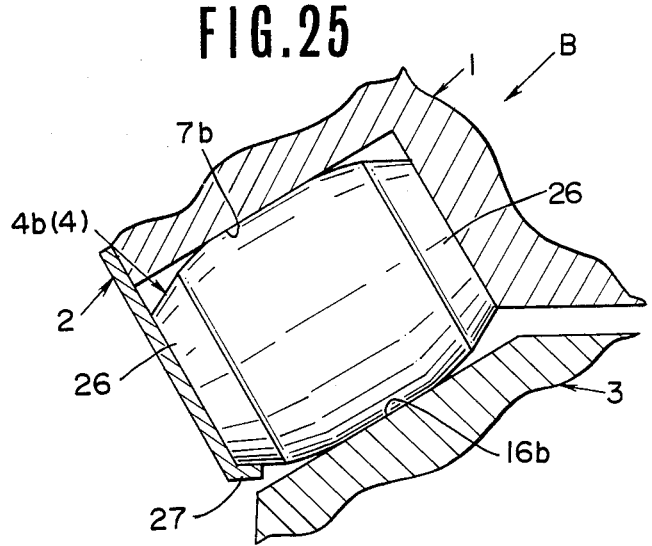
FIG. 25 is an enlarged sectional view showing, in an exaggerated manner, the relationship between the roller contacting surface and a cylindrical roller as shown in FIG. 24.

As shown in an exaggerated manner in FIG. 25, the cylindrical roller 4b incorporated in the roller bearing of the second embodiment has been subjected to a process called crowning so that the diameter of the cylindrical roller is reduced at axial end regions near the tapered portions 26. This form of the cylindrcal roller effectively prevents the generation of the edge load even in the case of the slight skew of the cylindrical roller 4b.

Figure 26:
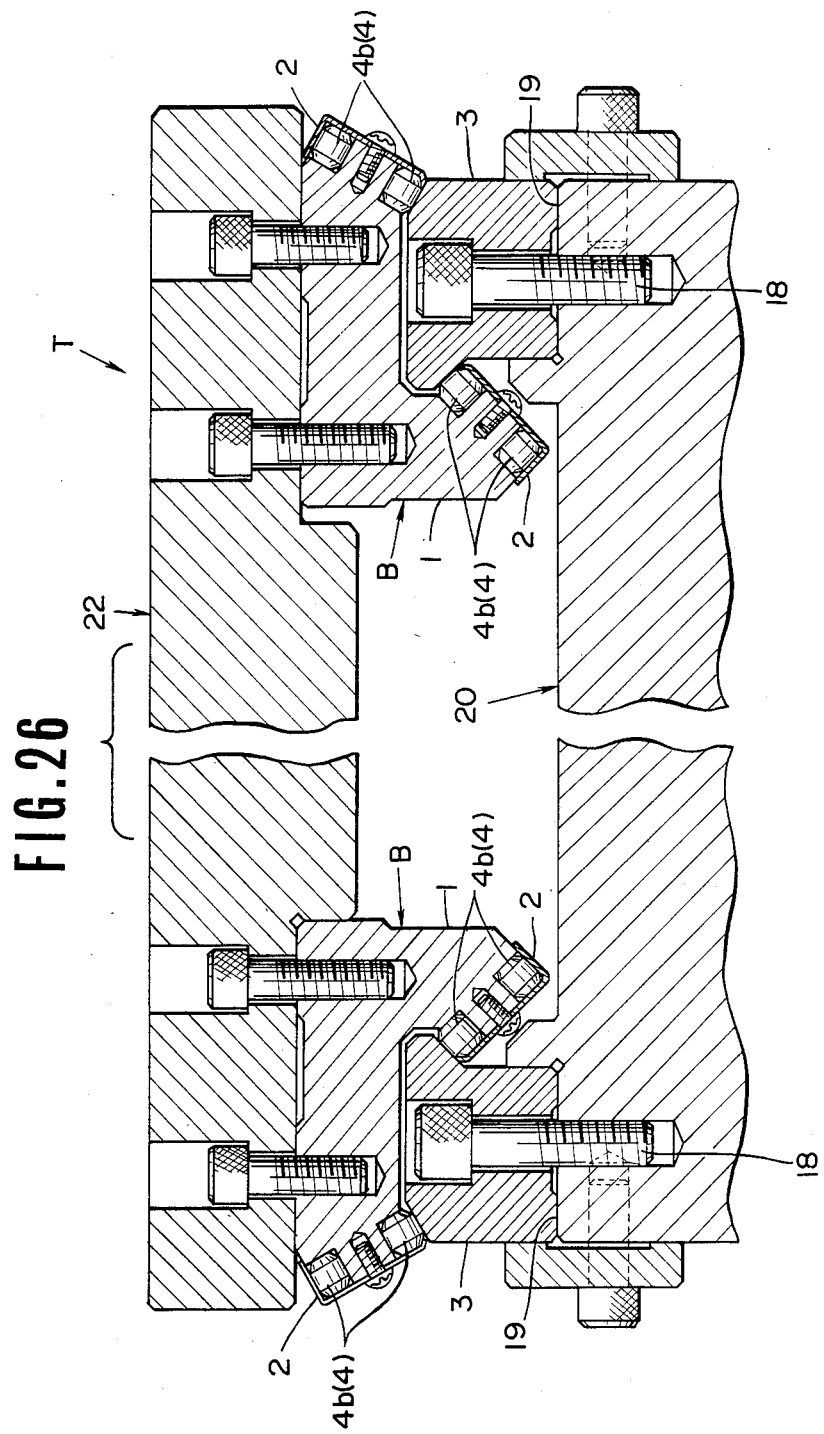
FIG. 26 is a cross-sectional view of a feed table for linear sliding motion incorporating roller bearings as shown in FIG. 25.

FIG. 26 shows a feed table T making use of the roller bearing B for linear sliding motion in accordance with a second embodiment of the invention. This feed table T is materially same as that shown in FIG. 18 except that the shims 13 for pre-loading the roller bearings are omitted.

Figure 27:
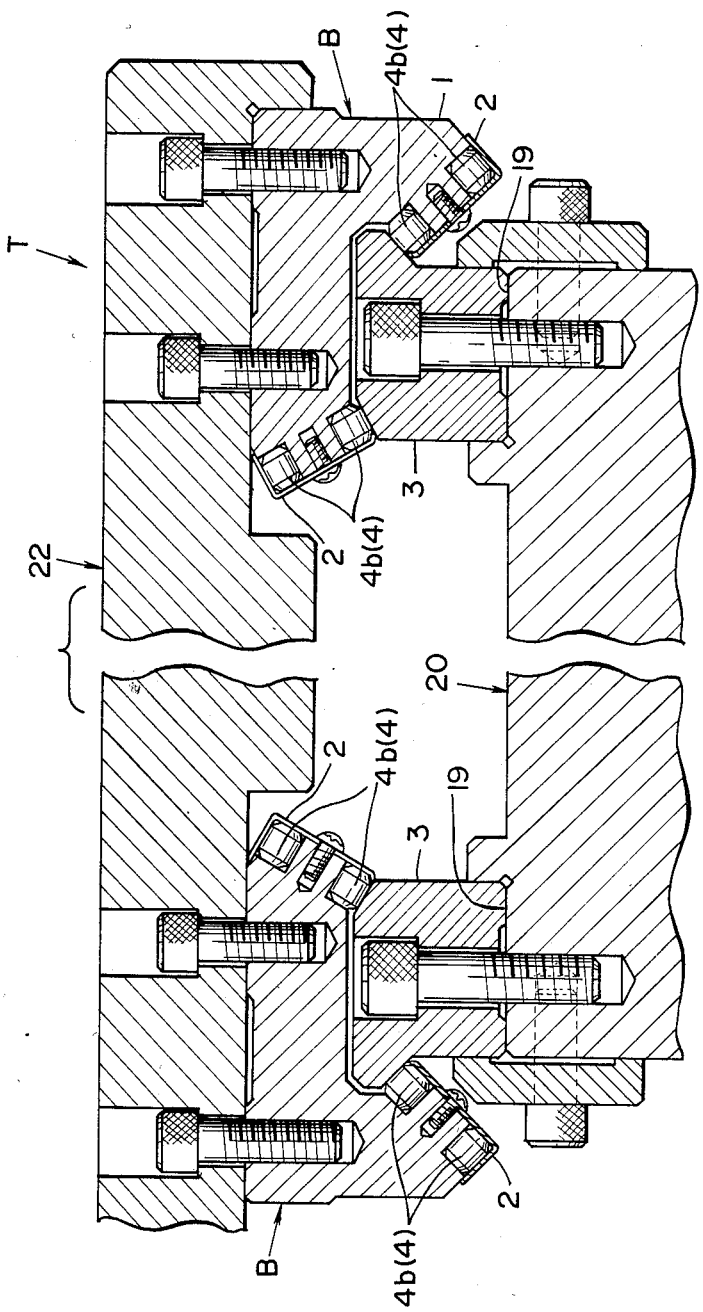
FIG. 27 is a cross-sectional view of a modification of a feed table incorporating therein the roller bearing as shown in FIG. 24.
Figure 28:
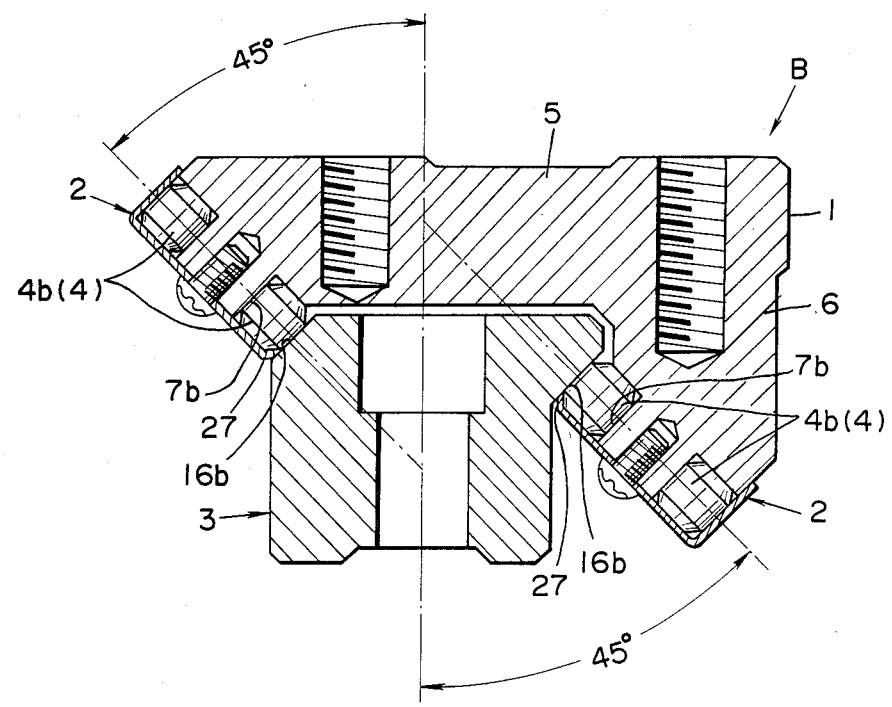
FIG. 28 is a sectional view similar to that in FIG. 24, showing a modification of the roller bearing for linear sliding motion as shown in FIG. 20.

FIG. 27 shows a modification of the feed table T shown in FIG. 26, corresponding to the modification shown in FIG. 19, while FIG. 28 shows another modification of the feed table shown in FIG. 26 corresponding to the modification shown in FIG. 20.

It will be understood that the roller bearing for linear sliding motion in accordance with the second embodiment, as well as the feed table incorporating this roller bearing, offers the same advantages provided by the first embodiment described before. In addition, in this second embodiment, the assembling of the slider 1 and the mounting of the same on the track shaft 3 are facilitated because the cylindrical rollers 4b do not come off even when the slider 1 is separated from the track shaft 3, thanks to the provision of the retainer claw 27 on the roller guide 2.

In the embodiments described hereinbefore, the non-loaded regions of the endless roller tracks are constructed in the form of non-loaded grooves 9 in cooperation with the roller guides 2. Obviously, however, these non-loaded regions of respective tracks may be constituted by through bores formed in the end of the horizontal portion 5 and in the lower end of the vertical portion of the slider 1.

As has been described, according to the invention, there are provided a roller bearing for linear sliding motion and a feed table incorporating the roller bearing which bring about the following advantages.

Namely, the load-bearing capacity of the bearing or the feed table is increased particularly for the vertical downward load. In addition, the roller bearing or the feed table can be produced easily at a reduced cost, partly because the number of the surfaces on the slider and the track shaft requiring troublesome machining and finishing is reduced and partly because the number of parts is decreased. The roller-contacting surfaces can be machined and finished easily and precisely by grinders G which are applied without difficulty even to the slider, as shown by imaginary line in FIG. 6.

Although the invention has been described through specific terms, it is to be noted here that the described embodiments are not exclusive and various changes and modifications may be imparted thereto without departing from the scope of the invention which is limited solely by the appended claims.

What is claimed is:

1. A roller bearing for linear sliding motion comprising:
a slider in the form of an L-shaped cross-section having a horizontal portion and a vertical portion depending from one end of said horizontal portion, said slider being provided with only two loaded grooves with the first formed in the lower surface of the other end of said horizontal portion and the second formed in the inner surface of the lower end of said vertical portion, said loaded groove in said horizontal portion having a downwardly facing inclined roller-contacting surface, said loaded groove in said vertical portion having an upwardly facing inclined roller-contacting surface, said slider being provided also with a pair of non-loaded portions extending axially along the other end of said horizontal portion and on the lower end of said vertical portion, respectively, so as to constitute non-loaded regions;
a pair of roller guides attached to the other end of said horizontal portion and to the lower end of said vertical portion, respectively, of said slider and cooperating with said loaded grooves and non-loaded portions to form a pair of endless roller tracks;
a track shaft having only two roller-contacting surfaces wherein on its one side an upwardly facing inclined roller-contacting surface is opposed to said downwardly facing inclined roller-contacting surface in said horizontal portion, and on its other side a downwardly facing inclined roller-contacting surface is opposed to said upwardly facing inclined roller-contacting surface in said vertical portion; and
a multiplicity of rollers adapted to be circulated through said respective endless roller tracks formed on said horizontal and vertical portions of said slider, thereby to bear the load acting between said roller-contacting surfaces on said slider and corresponding roller-contacting surfaces on said track shaft.

2. A roller bearing for linear sliding motion according to claim 1, wherein said non-loaded portions formed on said horizontal portions and said vertical portions of said slider are non-loaded grooves which cooperate with said loaded grooves formed in said horizontal and vertical portions and with said roller guides in constituting said endless roller tracks.

3. A roller bearing for linear sliding motion according to claim 2, wherein each of said roller guides is formed by press from a metal sheet or by injection molding from a hard resin, and has, at its both ends, a pair of roller turning sections of a substantially semi-circular form and a holding section through which said roller turning sections are connected to each other, said holding section having a substantially L-shaped cross-section to prevent the dropping of said rollers circulated along said loaded grooves and non-loaded grooves.

4. A roller bearing for linear sliding motion according to any one of claims 1 to 3, wherein each of said roller-contacting surfaces on said slider and said track shaft has an arcuate cross-section, while said rollers circulated through said endless roller tracks are spheroidal rollers.

5. A roller bearing for linear sliding motion according to claim 4, wherein said cross-section of said roller-contacting surface has a radius of curvature which is slightly greater than that of the spheroidal surface of said spheroidal roller.

6. A roller bearing for linear sliding motion according to any one of claims 1 to 3, wherein each of said roller contacting surfaces formed on said slider and said track shaft are flat surfaces, while said rollers circulated through said endless roller tracks are cylindrical rollers.

7. A roller bearing for linear sliding motion according to any one of claims 1 to 3, wherein said roller contacting surfaces adjacent to said the other end of said horizontal portion are inclined at 30° to a vertical plane, while said roller contacting surfaces adjacent to said vertical portion are inclined at 45° to the vertical plane.

8. A roller bearing for linear sliding motion according to any one of claims 1 to 3, wherein all of said roller contacting surfaces are inclined at 45° to a vertical plane.

9. A feed table for linear sliding motion comprising:
a pair of sliders each in the form of an L-shaped cross-section having a horizontal portion and a vertical portion depending from one end of said horizontal portion, said slider being provided with only two loaded grooves with the first formed in a lower surface on the other end of said horizontal portion and the second formed in the inner surface of the lower end of said vertical portion, said loaded groove in said horizontal portion having a downwardly facing inclined roller-contacting surface, said loaded groove in said vertical portion having an upwardly facing inclined roller-contacting surface, said slider being provided also with a pair of non-loaded portions extending axially along the other end of said horizontal portion and on the lower end of said vertical portion, respectively, so as to constitute non-loaded regions;
a pair of roller guides attached to the other end of said horizontal portion and to the lower end of said vertical portion, respectively, of each slider and cooperating with said loaded grooves and non-loaded portions to form a pair of endless roller tracks;
a bed provided on its upper surface with a pair of mounting reference surfaces;
a pair of track shafts fixed to said mounting reference surfaces of said bed and each track shaft having only two roller-contacting surfaces wherein for each track shaft, on its one side an upwardly facing inclined roller-rolling surface is opposed to a respective said downwardly facing inclined roller-contacting surface in said horizontal portion, and on its other side a downwardly facing inclined roller-contacting surface is opposed to a respective said upwardly facing inclined roller-contacting surface in said vertical portion;
a multiplicity of rollers adapted to be circulated through said respective endless roller tracks formed on said horizontal and vertical portions of said slider, thereby to bear the load acting between said roller-contacting surfaces on said slider and corresponding roller-contacting surfaces on said track shaft; and
a mounting base attached to the upper surfaces of said sliders.

10. A feed table according to claim 9, wherein said roller-contacting surfaces on said slider and said track shaft have an arcuate cross-section, while said rollers are spheroidal rollers each having a spheroidal surface of a radius of curvature slightly smaller than that of said cross-section of said roller contacting surfaces, and wherein said mounting base is fixed to each of said sliders by means of pairs of connecting bolts spaced in the breadthwise direction from each other such that a twisting force directed from the lower end of said vertical portion to said the other end of said horizontal portion is imparted to each slider by an adjustment of tightening forces on said connecting bolts, thereby to impart pre-loads acting to said spheroidal rollers between said roller contacting surfaces.

11. A roller bearing for linear sliding motion according to claim 4, wherein said roller contacting surfaces adjacent to said the other end of said horizontal portion are inclined at 30° to a vertical plane, while said roller contacting surfaces adjacent to said vertical portion are inclined at 45° to the vertical plane.

12. A roller bearing for linear sliding motion according to claim 5, wherein said roller contacting surfaces adjacent to said the other end of said horizontal portion are inclined at 30° to a vertical plane, while said roller contacting surfaces adjacent to said vertical portion are inclined at 45° to the vertical plane.

13. A roller bearing for linear sliding motion according to claim 6, wherein said roller contacting surfaces adjacent to said the other end of said horizontal portion are inclined at 30° to a vertical plane, while said roller contacting surfaces adjacent to said vertical portion are inclined at 45° to the vertical plane.

14. A roller bearing for linear sliding motion according to claim 4, wherein all of said roller contacting surfaces are inclined at 45° to a vertical plane.

15. A roller bearing for linear sliding motion according to claim 5, wherein all of said roller contacting surfaces are inclined at 45° to a vertical plane.

16. A roller bearing for linear sliding motion according to claim 6, wherein all of said roller contacting surfaces are inclined at 45° to a vertical plane.

* * * * *